Patented July 29, 1947

2,424,627

UNITED STATES PATENT OFFICE 2,424,627

MONAZO AND DISAZO DYES WITH N-SUBSTITUTED 1,3,5 XYLIDINES

Henry Charles Olpin and John Wright, Spondon, near Derby, England, assignors to British Celanese Limited, London, England, a company of Great Britain No Drawing. Application July 8, 1942, Serial No. 450,190 In Great Britain August 13, 1941

22 Claims. (Cl. 260—186)

This invention relates to the manufacture of new azo dyes particularly suitable for the colouration of fibres, foils, films and the like of cellulose acetate or other cellulose esters and ethers.

According to the present invention new azo dyes are obtained by coupling diazo compounds (including those obtainable by diazotising amino azo compounds) with N-substitution products of 3:5-di-substituted anilines and particularly with the N-alkyl derivatives and other N-substitution products of 3:5-dimethyl-aniline (1:3:5-xylidine). The coupling component, namely the N-substituted-3:5-di-substituted aniline is thus characterised by having nuclear substituents in each of the meta positions to the amino group.

As compared with the analogous dyes made from coupling components containing no substituent or but one substituent in meta position to the amino group, the dyes of the present invention yield shades which have a tertiary cast or a more pronounced tertiary cast.

A "shade having a tertiary cast" is one which cannot be matched on a textile material by dyeing with a mixture of two only of a set of three dyes, dyeing individually in pure yellow, pure red and pure blue shades respectively, but requires the use of all three of the said dyes. The browns are examples of shades having a tertiary cast. They cannot be matched on a textile material by any mixture of two of the aforesaid pure yellow, pure red and pure blue dyes, but require a mixture of all three, in which mixture the red and yellow predominate. Navy blues are further examples of such shades. In this case matching can only be effected with a mixture of the three dyes in which blue predominates. Again, in the case of bottle green, matching can be effected with a mixture of the three dyes in which the yellow and blue predominate.

A "shade having a tertiary cast" can also be regarded as one which absorbs a substantial proportion of all wavelengths from white light incident thereon, or in other words one which has a content of grey. Thus "brown" as applied to a dyeing on a textile material can be regarded as "coloured" with a mixture of grey, red and yellow, and navy-blue can be regarded as "coloured" with a mixture of grey and blue.

Mono-azo dyes produced in accordance with the invention from diazo compounds of mono nuclear amines of the benzene series can be employed for the direct dyeing of cellulose acetate and other cellulose ester of ether textile materials. For instance a dye which dyes cellulose acetate directly in brown shades can be obtained by coupling diazotised 2:6-dichlor-4-nitro-aniline with the N-di(hydroxy-ethyl) derivative of 1:3:5-xylidine. The disazo and other polyazo dyes produced in accordance with the invention have, as a class, but low affinity for cellulose acetate textile material when applied thereto in aqueous dye baths. They can, however, be used for colouring this material by application thereto in the form of solutions in organic liquids. Again, they can be employed for the colouration of solutions of cellulose acetate and other cellulose esters or ethers and these coloured solutions can be shaped and set so as to obtain fibres, foils, films and the like coloured with the new dyes. Again, the new disazo and other polyazo dyes can be formed on cellulose ester or ether materials by coupling thereon the appropriate diazo compound with the appropriate N-substitution product of a 3:5-di-substituted aniline.

The amino group of the 3:5-di-substituted aniline may carry but a single substituent, but preferably two substituents are present. When two substituents are present they may be identical or they may differ one from the other. The substituent or substituents can be, for instance, aralkyl, cycloalkyl, or alkyl (including both substituted and unsubstituted aralkyl, cycloalkyl, and alkyl groups). Examples are methyl, ethyl, hydroxyethyl and other hydroxy-alkyl groups, sulphato-alkyl groups, e. g., the sulphato-ethyl group, sulpho-alkyl groups, e. g., the sulpho-ethyl group and carboxy-alkyl groups, e. g., the carboxy-methyl group. Preferably not more than one sulphato-alkyl, sulpho-alkyl or carboxy-alkyl group is present. A second substituent, if present, should be a group which does not contain a sulphato group, a sulpho group or a carboxy group.

The substituent or substituents in the amino group of the coupling component should be non-aromatically linked to the nitrogen of the amino group. That is to say, if the substituent contains an aromatic nucleus there should not be direct linkage between a carbon atom of said nucleus and the nitrogen of the amino group. Aromatically linked substituents appear to be disadvantageous and dyeings of inferior fastness to light have been obtained with dyes made with 3:5-di-substituted anilines containing such N-substituents.

The substituents present in the 3- and 5-positions of the nucleus of the coupling component can be, for instance, alkyl, e. g., methyl, alkoxy, e. g., methoxy, ethoxy or beta-hydroxyethoxy, acidylamino, e. g., acetylamino or benzoylamino, or halogen, e. g., chlorine or bromine.

Examples of N-substitution products of 3:5-di-substituted anilines which can be employed as coupling components in accordance with the invention are the N-diethyl and N-di(beta-hydroxy-ethyl) derivatives of 3:5-dimethyl-aniline, 3-methoxy-5-acetylamino-aniline, 3-methyl-5-chloraniline, and 3-methyl-5-bromoaniline. The diethyl derivatives can be obtained by ethylating the parent amines with ethyl chloride. Again, the hydroxy-ethyl derivatives can be obtained by the action of ethylene oxide on the parent amines. Other N-substitution products can be obtained in analogous manner, namely by the action of appropriate aralkylating, cycloalkylating, or alkylating agents upon the parent amines.

The 3-methoxy-5-acetylamino-aniline referred to above can be obtained by reduction of the corresponding nitro compound.

Diazo compounds of a wide range of diazotisable amines can be employed for coupling with the N-substitution products of 3:5-di-substituted anilines in accordance with the invention. For the production of mono-azo dyes can be employed the diazo compounds of aniline and its nuclear substitution products in which the substituents are, for instance, nitro, halogen, alkyl, alkoxy, acidylamino, alkyl-sulphone, cyano, or combinations of these substituents. Diazo compounds of amines having a nitro group in para position to the diazotisable amino group are especially useful. Extremely valuable results can be obtained when the amine contains, in addition to the para-nitro group, two substituents, for example, halogen, each in ortho position to the diazotisable amino group. Again, the diazo compounds of 2-amino-benzthiazoles can be used. As specific diazotisable amines of which the diazo compounds can be employed are ortho-, meta- and para-nitro aniline, ortho-, meta- and para-chloraniline, 4-nitro-2-chloraniline, 4-nitro-2-methoxy-aniline, 2:4-di-nitro-6-chloraniline, 2:4-di-nitro-6-cyano-aniline, 2:6-dichlor-4-nitro-aniline, 2-chlor-6-bromo-4-nitro-aniline, 2-amino-benzthiazole and its 4- or 6-methoxy- or 4- or 6-methyl-derivatives.

Disazo and other polyazo dyes can be obtained by coupling with the N-substituted-3:5-di-substituted anilines the diazo compounds of a wide range of diazotisable amino azo compounds, for instance those described in U. S. Patent No. 2,289,413 and copending U. S. application S. N. 448,830, filed June 27, 1942. Such amino azo compounds are those obtainable by coupling aniline or alpha-naphthylamine or nuclear substitution products thereof, e. g., those mentioned above in connection with the production of monoazo dyes, with para coupling primary aromatic amines. In these latter are included such as contain a substituent in meta position to the primary amino group or two substituents, each in meta position to the primary amino group, or one substituent in meta position and another substituent in para position to the said meta substituent, that is, in an ortho position to the primary amino group. These nuclear substituents in the para coupling amine can be, for example, halogen, alkyl, alkoxy (including substituted alkoxy, e. g., beta-hydroxy ethoxy) and acidylamino. Specific para-coupling primary amines are meta-toluidine, 3-amino-4-methoxy-1-methyl-benzene, para-xylidine, 2:5-dimethoxy-aniline, 2:5-di-ethoxy-aniline, 2:5-di(beta-hydroxy-ethoxy)-aniline, mono-acetyl-meta-phenylene-diamine, 2-amino-4-acetylamino-toluene, 2-amino-4-acetylamino-anisole, 2-amino-4-acetylamino-1-(beta-hydroxy-ethoxy) benzene, 2:5-di(beta-hydroxy-ethoxy)-aniline, 3:5-dimethyl-aniline, 3-methoxy-5-acetylamino-aniline, 3-methyl-5-chloraniline.

The following are specific examples of amino-azo compounds of which the diazo compounds can be utilised:

1. 4-nitro-4'-amino-2':5'-dimethoxy-azo-benzene
2. 4-nitro-4'-amino-2':5'-diethoxy-azo-benzene
3. 4-nitro-4'-amino-1:1'-benzene-azo-naphthalene
4. 4-nitro-2-chlor-4'-amino-1:1'-benzene-azo-naphthalene
5. 4-nitro-2-methoxy-4'-amino-1:1'-benzene-azo-naphthalene
6. 4-nitro-4'-amino-2'-acetylamino-5'-methoxy-azo-benzene
7. 4-nitro-4'-amino-2':6'-dimethyl-azo-benzene
8. 4-nitro-2:6-dichlor-4'-amino-2':6'-dimethyl-azo-benzene
9. 4-methoxy-3:5-dimethyl-4'-amino-azo-benzene
10. The amino-azo compound obtainable by coupling diazotised 2-amino-benzthiazole with 3-amino-4-methoxy-1-methyl-benzene As already indicated, some of the dyes of the present invention are suitable for the direct dyeing of cellulose acetate and other cellulose ester or ether materials. When soluble in water they can be applied to the materials as aqueous solutions, if desired with addition of sodium chloride, sodium sulphate or the like to assist exhaustion of the dye bath. When the dyes are insoluble in water they can be applied in the form of aqueous dispersions. The latter can be prepared in any convenient manner, for example by mechanical milling of the dye with water or by the action of aqueous solutions of dispersing agents or by a combination of these methods. The invention includes liquid, paste, solid or other preparations consisting of the dyes together with dispersing agents and/or protective colloids. Further, the dyes, including those which have low affinity for the material when applied from aqueous baths, can be applied to cellulose ester or ether materials in the form of solutions in organic liquids; for instance they can be applied in the organic liquids and by the methods described in co-pending U. S. application S. No. 448,165, filed June 23, 1942, in connection with the application of arylamino anthraquinones.

The azo dyes of the present invention can also be formed on the textile fibres, foils, films or the like, made from cellulose acetate or other cellulose esters and ethers, so as to colour the latter. Particularly useful results can be obtained by forming the disazo and other polyazo dyes of the invention on the material in this manner. It is thus possible to obtain on such materials a range of shades having a tertiary cast and of very good fastness properties, particularly to aqueous treatments. For example, full, deep brown shades can be obtained on cellulose acetate fibres, by incorporating therein 4-nitro-4'-amino-2':6'-dimethyl-azo-benzene and diazotising the latter on the fibre and coupling with N-di(beta-hydroxy-ethyl)-3:5-dimethyl aniline.

As regards the procedure to be followed in forming the dyes on cellulose ester or ether materials, it is preferred to incorporate the diazo component in the material and then to effect diazotisation and couple with the coupling component in a separate bath.

The diazo components can be applied to cellulose ester or ether materials in the form of aqueous dispersions. Bath methods may be employed, that is to say methods in which the materials are allowed to absorb the diazo component from an aqueous dispersion of the latter in which they are immersed. Again, mechanical impregnation methods may be used, the materials being impregnated with a quantity of liquid containing the requisite proportion of diazo component. To this end padding or printing methods may be utilised. The mechanically impregnated material may then be aged or steamed to cause the diazo component to enter the cellulose ester or ether material.

If a diazo component having substantive affinity for cellulose esters or ethers but substantially no substantive affinity for cellulose is applied to mixed materials containing both cellulose (e. g., cotton or regenerated cellulose) and a cellulose ester or ether, the latter alone takes up the diazo component, so that on diazotising and coupling with the N-substituted-3:5-di-substituted-aniline the cellulose component of the material remains uncoloured. By suitably colouring the cellulose component of such mixed material with dyes resisting the cellulose ester or ether component of the materials solid shades or two colour effects can readily be obtained according to the components and dyes selected. The dye for the cellulose portion can be applied before or after the development of the azo dye on the cellulose ester or ether portion. If desired, however, it may be applied before development and either together with or separately from the diazo component applied to the cellulose ester or ether portion. If the dye for the cellulose component is diazotisable it can be diazotised and developed with a suitable coupling component at any convenient stage of the operation. Further, if desired, the N-substituted-3:5-di-substituted-aniline employed in accordance with the present invention for the formation of an azo dye on the cellulose ester or ether component of the material may simultaneously be used to develop the diazotised dyestuff on the cellulose component of the mixed material.

The dyeings thus produced on cellulose ester or ether materials may subsequently be topped with other dyes and particularly with dyes having direct affinity for the cellulose ester or ether. If desired, instead of applying the topping colours after the formation of the dye on the material in accordance with the invention, the said topping colours can be applied prior to the coupling operation; for example they may be applied to the material together with the diazotisable amino-azo compound. Again they may be applied together with the coupling component. In this way some economy of time and materials may often be secured.

When produced in substance, the azo dyes of the invention, particularly the disazo and other polyazo dyes, can be used for colouring cellulose ester or ether solutions, especially lacquers and spinning solutions. By shaping and setting such solutions in the form of filaments, foils, films and the like valuable coloured products can be produced. For example, coloured cellulose acetate filaments can be produced by dry spinning such coloured solutions. The coloured products so obtained by spinning methods can be topped with suitable direct dyeing dyes or mixtures of dyes in order to produce a wide range of deep shades.

A single product of this kind can, by suitable choice of topping colour, be caused to yield a very large number of commercially desirable shades.

The dyes of the invention are more particularly of value for the production of coloured cellulose acetate products. They may, however, be used for the production of coloured products of other cellulose esters, for example cellulose formate, propionate, butyrate, or acetate-butyrate, or of cellulose ethers, for example, methyl, ethyl or benzyl cellulose. Again they can be used for colouring fibres, foils, films and the like of synthetic linear polymers, for example superpolyamide fibres, e. g., fibres of superpolyamides obtained from hexamethylene diamine and adipic acid.

The invention is illustrated by the following examples:

EXAMPLE I

*Preparation of azo dye from p-nitraniline and N-di(beta-hydroxyethyl)-1:3:5-xylidine*

138 parts of p-nitraniline are stirred in 400 parts of water and 350 parts of hydrochloric acid (32° Tw.) and an aqueous solution of sodium nitrite is added so as to diazotise the p-nitraniline and leave a slight excess of nitrous acid. About 70 parts of sodium nitrite is required. When diazotisation is complete the solution is filtered and excess nitrous acid removed by the addition of a little urea or sulphamic acid. The resulting diazo solution is then run with good stirring into a solution of 209 parts of di-(beta-hydroxyethyl)-1:3:5-xylidine in 4000 parts of water and 120 parts of hydrochloric acid 32° (Tw.). After stirring for one hour the mixture is rendered neutral to Congo red paper by addition of sodium acetate and after stirring for a further hour the dye is filtered off and either mixed with a dispersing agent and dried or milled as a 10% aqueous paste. It dyes cellulose acetate directly in brown-red shades.

In a similar manner diazotised p-aminoacetanilide yields a golden yellow dye when coupled with N-di-(beta-hydroxyethyl)-1:3:5-xylidine and diazotised m-nitro-aniline yields a brownish orange dye with the same coupling component.

EXAMPLE II

*Preparation of an azo dye from 2:6-dichlor-4-nitraniline and N-di-(beta-hydroxyethyl)-1:3:5-xylidine*

207 parts of 2:6-dichlor-4-nitraniline are slowly added to a solution of nitrosyl sulphuric acid prepared by dissolving 70 parts of dry sodium nitrite in 1300 parts of sulphuric acid, raising the temperature to 70° C. and allowing to cool. During the addition of the 2:6-dichlor-4-nitraniline the temperature is kept at 30–35° C. When the addition is completed it is stirred for two hours and poured into a mixture of 4000 parts ice and 1000 parts water and the clear aqueous diazo solution is slowly added to a stirred solution of 209 parts of N-di-(beta-hydroxyethyl)-1:3:5-xylidine in 4000 parts of water and 120 parts of hydrochloric acid (32° Tw.). The mixture is stirred for one hour, rendered neutral to Congo red paper and then stirred for a further two hours and the dye filtered off. It can then be milled as a 10% aqueous paste or mixed with a dispersing agent and dried. It dyes cellulose acetate directly in brown shades.

By substituting 1-di(beta-hydroxyethyl)-amino-3-methyl-5-chlor-benzene (obtainable by the action of ethylene oxide on 3-methyl-5-chloraniline) for the xylidine derivative a brown dye is likewise obtained.

EXAMPLE III

*Production on the fibre of an azo dye from 4-nitro-2':6'-dimethyl-4'-amino-azobenzene and N-di(beta-hydroxyethyl)-1:3:5-xylidine*

10 parts of a finely milled 10% aqueous paste of 4-nitro-2':6'-dimethyl-4'-amino-azobenzene is dispersed in 4000 parts of a 0.025% soap solution containing 0.025 part of soap in 100 parts of water. 100 parts of cellulose acetate fabric are now entered, and worked in the dyebath while the temperature is raised to 75-80° C. and maintained thereat for 1 hour 30 minutes. The fabric is then removed and rinsed in water and is then immersed for 35-45 minutes in a diazotising bath prepared with 3000 parts of water, 20 parts of hydrochloric acid (32° Tw.), and 5 parts of sodium nitrite. The fabric is then taken out, rinsed in water, and immersed in a developing bath containing 3.0 parts of N-di(beta-hydroxyethyl)-1:3:5-xylidine dispersed with 6-8 parts of Turkey red oil in 3000 parts of water at 40° C. After immersion the temperature is raised to 60° C. and maintained thereat for a further 30-45 minutes while the fabric is worked in the bath. At the end of this time the fabric is removed and soaped for 30 minutes at 60° C. in 3000 parts of 0.025% soap solution. The fabric is then washed and dried. The shade of the disazo dyestuff so obtained on the fabric is a deep red-brown.

Brown shades are similarly obtained on the fibre from the above mentioned coupling component and 2:6-dichlor-4-nitro-2':6'-dimethyl-4'-amino-azobenzene. Again by using the coupling component in conjunction with 4-nitro-4'-amino-3'-acetylamino-6'-methoxy-azobenzene reddish blue to navy-blue shades can be obtained according to the proportions of components applied.

EXAMPLE IV

*Production of azo dye in substance from 4-nitro-2':6'-dimethyl-4'-amino-azobenzene and N-diethyl-1:3:5-xylidine*

24 parts of 4-nitro-2':6'-dimethyl-4'-amino-azobenzene are stirred in 50 parts of hydrochloric acid and 500 parts of water and then diazotised at 25-30° C. by the addition of 7 parts of sodium nitrite dissolved in a little water. When diazotisation is complete the diazo solution is slowly added to a solution of 17 parts of N-diethyl-1:3:5-xylidine in 400 parts of water and 12 parts of hydrochloric acid (32° Tw.). After stirring for one hour sufficient sodium acetate is added to render the mixture neutral to Congo red paper, and after stirring for a further hour the dye is filtered off and dried at 50-60° C.

0.25 part of this dye are ground with 5 parts of a 10% solution of cellulose acetate in acetone and the mixture added to 100 parts of a 25% solution of cellulose acetate in acetone. The coloured solution so obtained is then converted into fibres by dry-spinning in the normal manner. Red-brown fibres are then obtained.

Having described our invention what we desire to secure by Letters Patent is:

1. Process for the production of a new azo dye, which comprises coupling an N-substituted 3:5-dimethyl-aniline, of which each N-substituent is selected from the group consisting of methyl, ethyl and hydroxyethyl radicles, with a diazo compound of an amine of the group consisting of amines of the formulae $R_1$—$NH_2$ and $R_1$—N—N—$R_2$—$NH_2$ wherein the nucleus $R_1$ is selected from the group consisting of benzene nuclei, naphthalene nuclei and 2-benzthiazole nuclei, and wherein the nucleus $R_2$ is selected from the group consisting of benzene nuclei and naphthalene nuclei.

2. Process for the production of a new azo dye, which comprises coupling an N-di-substituted 3:5-dimethyl-aniline, of which each N-substituent is selected from the group consisting of methyl, ethyl and hydroxyethyl radicles, with a diazo compound of an amine of the group consisting of amines of the formulae $R_1$—$NH_2$ and $R_1$—N=N—$R_2$—$NH_2$ wherein the nucleus $R_1$ is selected from the group consisting of benzene nuclei, naphthalene nuclei and 2-benzthiazole nuclei, and wherein the nucleus $R_2$ is selected from the group consisting of benzene nuclei and naphthalene nuclei.

3. An azo dye selected from the group consisting of azo dyes of the formulae $R_1$—N=N—$R_3$ and $R_1$—N=N—$R_2$—N=N—$R_3$ wherein $R_3$ is the residue of an N-substituted 3:5-dimethyl-aniline, of which each N-substituent is selected from the group consisting of methyl, ethyl and hydroxyethyl radicles, wherein the nucleus $R_1$ is selected from the group consisting of benzene nuclei, naphthalene nuclei and 2-benzthiazole nuclei, and wherein the nucleus $R_2$ is selected from the group consisting of benzene nuclei and naphthalene nuclei.

4. An azo dye selected from the group consisting of azo dyes of the formulae $R_1$—N=N—$R_3$ and $R_1$—N=N—$R_2$—N=N—$R_3$ wherein $R_3$ is the residue of an N-di-substituted 3:5-dimethyl-aniline, of which each N-substituent is selected from the group consisting of methyl, ethyl and hydroxyethyl radicles, wherein the nucleus $R_1$ is selected from the group consisting of benzene nuclei, naphthalene nuclei and 2-benzthiazole nuclei, and wherein the nucleus $R_2$ is selected from the group consisting of benzene nuclei and naphthalene nuclei.

5. Process for the production of an azo dye, which comprises coupling a diazotized 4-nitro-4'-amino-2':6'-dimethyl-azobenzene with an N-di-substituted-1:3:5-xylidine, of which the N-substituents are selected from the group consisting of methyl, ethyl and hydroxyethyl radicles.

6. Process for the production of an azo dye, which comprises coupling a diazotized 2:6-dihalogen-4-nitro-4'-amino-2':6'-dimethyl-azobenzene with an N-di-substituted-1:3:5-xylidine, of which the N-substituents are selected from the group consisting of methyl, ethyl and hydroxyethyl radicles.

7. Process for the production of an azo dye which comprises coupling a diazotized 4-nitro-4'-amino-2':6'-dimethyl-azobenzene with N-di(beta-hydroxyethyl)-1:3:5-xylidine.

8. Process for the production of an azo dye which comprises coupling a diazotized 2:6-dichlor-4-nitro-4'-amino-2':6'-dimethyl-azobenzene with N-di(beta-hydroxyethyl)-1:3:5-xylidine.

9. Process for the production of an azo dye which comprises coupling a diazotized 4-nitroaniline with an N-di-sustituted-3:5-dimethyl aniline, of which the N-sustituents are selected from the group consisting of methyl, ethyl and hydroxyethyl radicles.

10. Process for the production of an azo dye which comprises coupling a diazotized 2:6-dihalogen-4-nitro-aniline with an N-di-substituted-3:5-dimethyl aniline, of which the N-substituents are selected from the group consisting of methyl, ethyl and hydroxyethyl radicles.

11. Process for the production of an azo dye, which comprises coupling a diazotized 2:6-dichlor-4-nitro-aniline with N-di(beta-hydroxyethyl)-1:3:5-xylidine.

12. An azo dye of the general formula

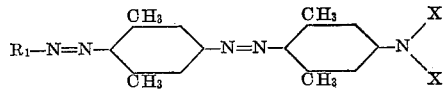

wherein $R_1$ represents a p-nitro-phenyl group and X is selected from the group consisting of methyl, ethyl and hydroxyethyl radicles.

13. A 4-nitro-2:6-dihalogen-4'-di-substituted amino-2':6'-dimethyl-azobenzene of which the substituents in the amino radicle are selected from the group consisting of methyl, ethyl and hydroxyethyl radicles.

14. Cellulose ester or ether materials colored with a dye claimed in claim 3.

15. Cellulose acetate materials colored with a dye claimed in claim 3.

16. Cellulose acetate materials colored with a dye claimed in claim 12.

17. Cellulose acetate materials colored with a dye claimed in claim 21.

18. Cellulose acetate materials colored with a dye claimed in claim 22.

19. A 4-nitro-4'-di-substituted-amino - 2':6'-dimethyl-azobenzene of which the substituents in the amino radicle are selected from the group consisting of methyl, ethyl and hydroxyethyl radicles.

20. 4-nitro-2:6-dichlor-2':6'-dimethyl - 4' - di (beta-hydroxyethyl)-amino-azobenzene.

21. 4(p-nitro-benzene-azo) - 3:5:2':6' - tetramethyl-4'-di(beta-hydroxyethyl) - amino - azobenzene.

22. 4(p-nitro-o:o-dichlor - benzene - azo)-3:5: 2':6'-tetra-methyl - 4' - di(beta-hydroxyethyl)-amino-azobenzene.

HENRY CHARLES OLPIN.
JOHN WRIGHT.

REFERENCES CITED

The following references are of record in the file of this patent:

UNITED STATES PATENTS

| Number | Name | Date |
| --- | --- | --- |
| 2,086,031 | Holzach et al. | July 6, 1937 |
| 2,199,987 | Dickey et al. | May 7, 1940 |
| 2,132,872 | McNally et al. | Oct. 11, 1938 |
| 2,037,909 | Knight | Apr. 21, 1936 |
| 2,069,836 | Knight | Feb. 9, 1937 |
| 2,289,413 | Ellis et al. | July 14, 1942 |
| 2,082,156 | Felix et al. | June 1, 1937 |
| 2,131,894 | Knight | Oct. 4, 1938 |
| 2,173,417 | Huber | Sept. 19, 1939 |

Certificate of Correction

Patent No. 2,424,627. July 29, 1947.

HENRY CHARLES OLPIN ET AL.

It is hereby certified that error appears in the printed specification of the above numbered patent requiring correction as follows: Column 8, line 2, claim 1, for the formula "$R_1-N-N-R_2-NH_2$" read $R_1-N=N-R_2-NH_2$; and that the said Letters Patent should be read with this correction therein that the same may conform to the record of the case in the Patent Office.

Signed and sealed this 30th day of September, A. D. 1947.

[SEAL]

THOMAS F. MURPHY,
*Assistant Commissioner of Patents.*